US007406229B2

(12) United States Patent
Bae et al.

(10) Patent No.: US 7,406,229 B2
(45) Date of Patent: Jul. 29, 2008

(54) OPTICAL MODULE

(75) Inventors: Yu-Dong Bae, Suwon-si (KR); In-Kuk Yun, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/584,986

(22) Filed: Oct. 23, 2006

(65) Prior Publication Data

US 2007/0183718 A1 Aug. 9, 2007

(30) Foreign Application Priority Data

Feb. 9, 2006 (KR) ................. 10-2006-0012609

(51) Int. Cl.
*G02B 6/12* (2006.01)
*G02B 6/26* (2006.01)
*G02B 6/42* (2006.01)

(52) U.S. Cl. .............................. 385/47; 385/14; 385/15; 385/31; 385/39

(58) Field of Classification Search .................. 385/14, 385/15, 31, 39, 47, 49
See application file for complete search history.

(56) References Cited

U.S. PATENT DOCUMENTS 6,172,783 B1 * 1/2001 Funada et al. ............... 398/164

FOREIGN PATENT DOCUMENTS

| KR | 2000-4926 | 1/2000 |
|----|-----------|--------|
| KR | 2001-24407 | 3/2001 |
| KR | 10-383382 | 4/2003 |
| KR | 2004-81838 | 9/2004 |
| WO | 2005-31418 | 4/2005 |

* cited by examiner

*Primary Examiner*—Michael P. Mooney
(74) *Attorney, Agent, or Firm*—Cha & Reiter, LLC

(57) ABSTRACT

Provided is an optical module including a light source for generating an optical signal, a waveguide for waveguiding the optical signal, a photodetector for detecting the optical signal, a first reflecting mirror on the light source for reflecting the optical signal generated by the light source to a side of the waveguide, and a second reflecting mirror on the photodetector for reflecting an optical signal emitted from the waveguide in a vertical downward direction. The photodetector detects an optical signal reflected by the second reflecting mirror.

11 Claims, 11 Drawing Sheets

510

520

530

OPTICAL MODULE

CLAIM OF PRIORITY

This application claims priority under 35 U.S.C. § 119 to an application entitled "Optical Module," filed in the Korean Intellectual Property Office on Feb. 9, 2006 and assigned Serial No. 2006-12609, the contents of which are incorporated herein by reference.

BACKGROUND OF THE INVENTION

1. Field of the Invention

The present invention generally relates to an optical module having an optical waveguide structure, and in particular, to an optical module using an optoelectronic mixed Printed Circuit Board (PCB) or a flexible PCB in which an optical waveguide and an electrical printed circuit are integrated.

2. Description of the Related Art

Currently, there is an increasing demand for a technique for implementing high-speed data transmission over a short range for a compact device enabling transmission of video data using low power consumption. In addition, to solve electromagnetic wave inteference and wiring space problems occurring in electrical connections, a structure in which a transmitting module and a receiving module are optically connected is desired.

A Vertical Cavity Surface Emitting Laser (VCSEL) of a vertical light emitting type and a photodetector of a vertical light receiving type are typically used for achieving high-speed transmissions at low cost using low power. Such active optical elements of the vertical light emitting type or the vertical light receiving type are connected by a waveguide and a horizontal structure.

FIG. 1 illustrates a waveguide 100 applied to a conventional optical connection structure. Referring to FIG. 1, the waveguide 100 includes a board 110, a lower clad 121a, a core 122, and an upper clad 121b that are sequentially deposited on the board 110, and a light receiving element such as a photodetector 130 placed on the end portion of the upper clad 121b. A light source or optical elements of various forms in addition to the photodetector 130 may be placed on the end portion of the upper clad 121b.

A groove for reflecting an optical signal traveling inside the core 122 to a light receiving surface of the photodetector 130 is formed under the waveguide 100 on which the photodetector 130 is placed. The groove includes a reflecting surface 123 inclined with respect to the core section that is perpendicular to the traveling direction of the optical signal. In other words, the reflecting surface 123 is inclined with respect to the section of the core 122 in order to reflect an incident optical signal from the core 122 to the photodetector 130.

A paper "Design and Development of Optoelectronic Mixed Signal System-on-Package" disclosed by Lyer et al. in IEEE Transactions on Advanced Packaging, vol. 27, no. 2, 278-285 in May 2004 describes another optical module including a two-branch waveguide, an optical fiber, and an Si mirror on a sub mount, and a photo diode on the Si mirror.

However, the conventional optical module requires a complex process, such as forming an inclined groove in a waveguide and forming a reflecting mirror in the formed groove, thus resulting in degradation in yield. Moreover, the optical module suggested by Lyer et al. integrates a two-branch coupler in a waveguide form and optical elements capable of receiving and emitting light on a sub mount, increasing its volume and causing a loss due to intervals between elements. As a result, there is increase in power consumption due to the loss.

SUMMARY OF THE INVENTION

It is, therefore, an object of the present invention to provide an optical module having a small volume, which can be manufactured and miniaturized.

According to one aspect of the present invention, there is provided an optical module including a light source for generating an optical signal, a waveguide for waveguiding the optical signal, a photodetector for detecting the optical signal, a first reflecting mirror on the light source for reflecting the optical signal generated by the light source to a side of the waveguide, and a second reflecting mirror on the photodetector for reflecting an optical signal emitted from the waveguide in a vertical downward direction. The photodetector detects an optical signal reflected by the second reflecting mirror.

BRIEF DESCRIPTION OF THE DRAWINGS

The above features and advantages of the present invention will become more apparent from the following detailed description when taken in conjunction with the accompanying drawings in which.

DETAILED DESCRIPTION

Exemplary embodiments of the present invention will now be described in detail with reference to the annexed drawings. For the purposes of clarity and simplicity, a detailed description of known functions and configurations incorporated herein has been omitted for conciseness.

Figure 1:
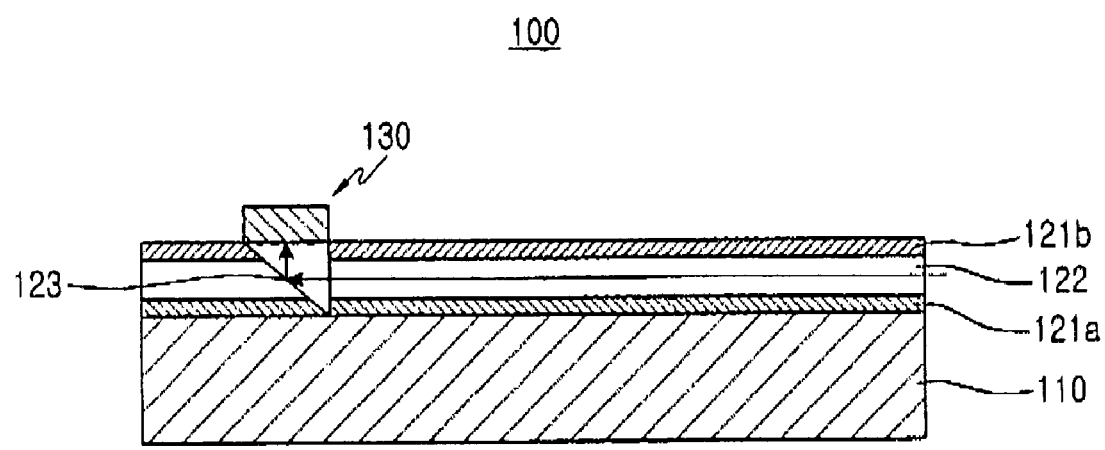
FIG. 1 illustrates a waveguide applied to a conventional optical connection structure.
Figure 2:
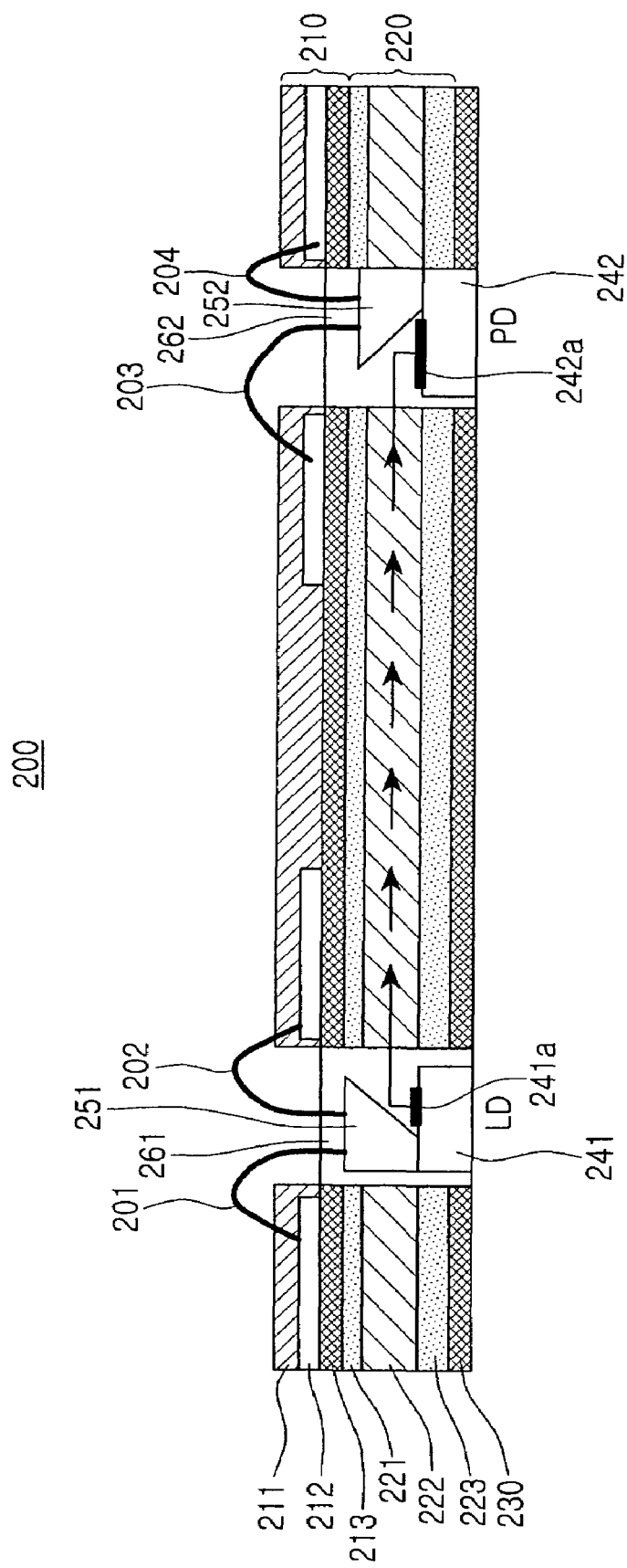
FIG. 2 illustrates an optical module according to a first embodiment of the present invention.

FIG. 2 illustrates an optical module 200 according to a first embodiment of the present invention. As shown, the optical module 200 includes a lower board 230, a light source 241 for generating an optical signal, a waveguide 220 on the lower board 230 for waveguiding the optical signal, a photodetector 242 for detecting the optical signal, a first reflecting mirror 251 on the light source 241 for reflecting the optical signal generated by the light source 241 to a side of the waveguide 220, a second reflecting mirror 252 on the photodetector 242 for reflecting the optical signal emitted from the waveguide 220 in a vertical downward direction, a Printed Circuit Board (PCB) 210 on the waveguide 220, and a plurality of grooves extending from the PCB 210 to the lower board 230.

Figure 3A:
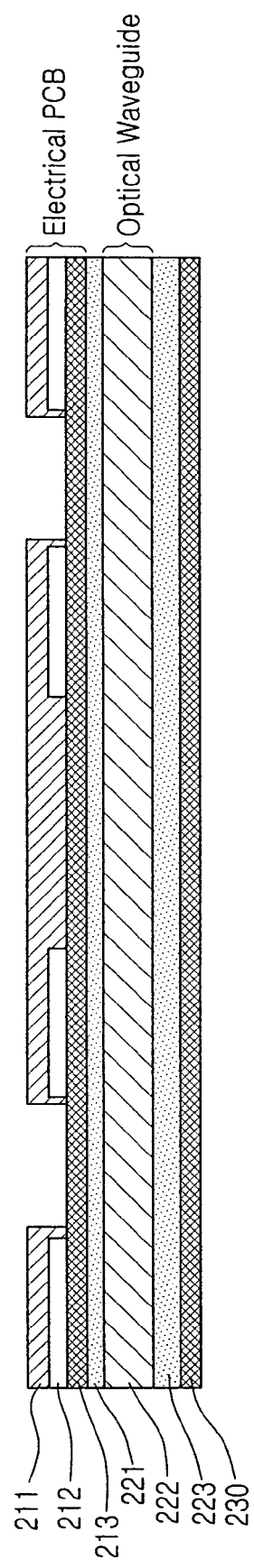
FIGS. 3A through 3D illustrate steps of manufacturing an optical module according to a first embodiment of the present invention.

FIGS. 3A through 3D illustrate steps of manufacturing the optical module 200. Referring to FIG. 3A, the waveguide 220 is formed on the lower board 230, and the PCB 210 is formed on the waveguide 220. The waveguide 220 includes a lower clad 223, a core 222 on the lower clad 223 for waveguiding an optical signal, and an upper clad 221 on the core 222.

The PCB 210 includes driving circuit patterns 212 for driving the light source 241 and the photodetector 242 on a board 213, and a protecting layer 211 may be formed on the PCB 210.

Figure 3B:
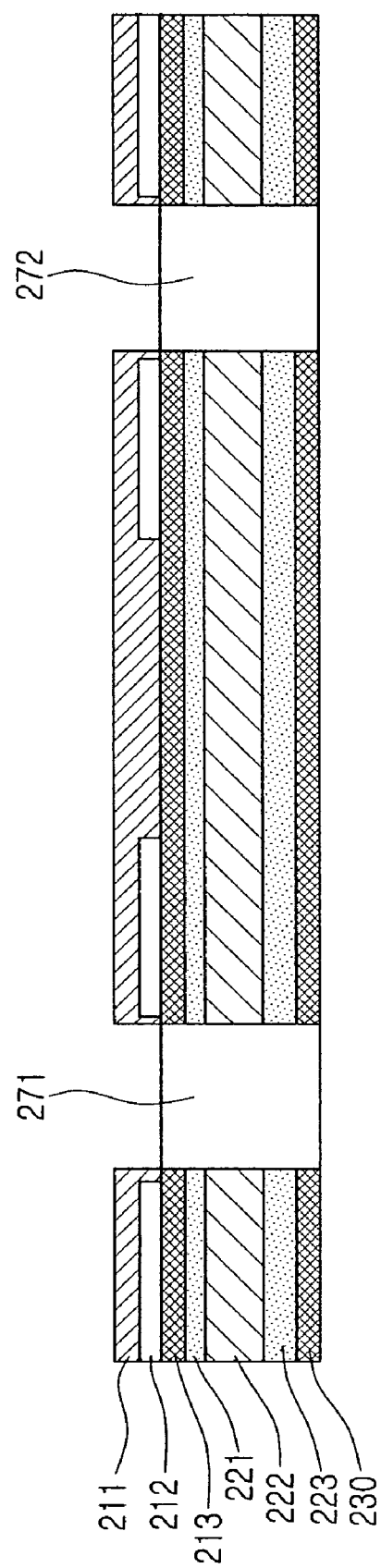

Referring to FIG. 3B, a plurality of grooves 271 and 272 extending from the PCB 210 to the lower board 230 are formed in the optical module 220 of FIG. 3A to expose the cleavage surface of the waveguide 220. The grooves 271 and 272 may be formed by a diamond blade.

Figure 3C:
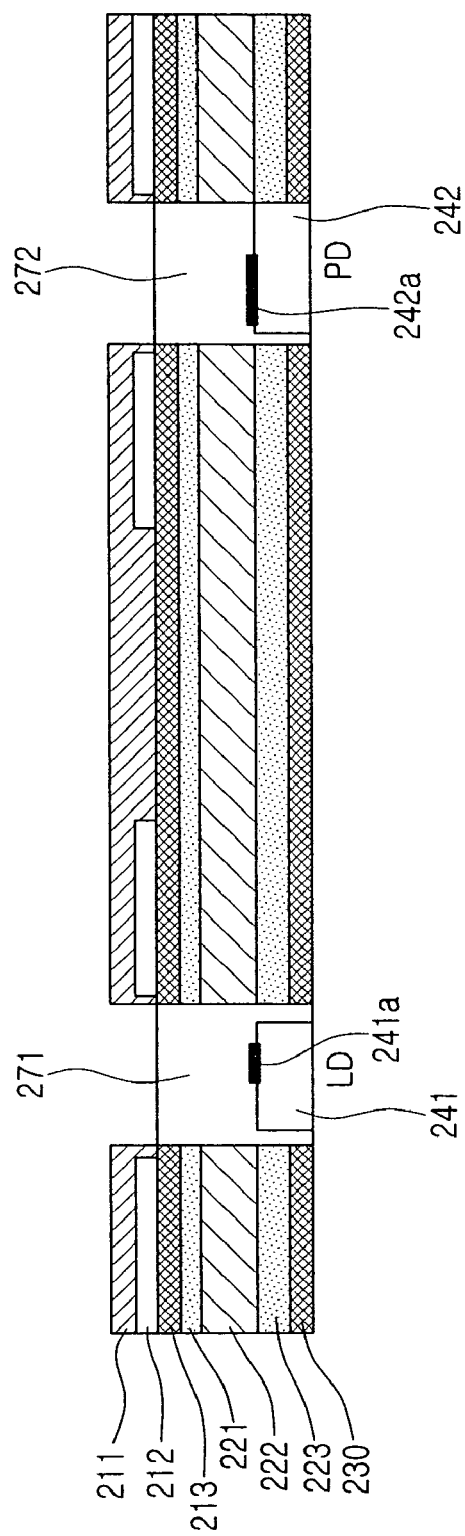

Referring to FIG. 3C, the light source 241 and the photodetector 242 are placed in the grooves 271 and 272 of the optical module 200 of FIG. 3B, respectively. The light source 241 and the photodetector 242 are positioned such that their light emitting surface 241a and light receiving surface 242a face the opened upper portions of the grooves 271 and 272. To improve heat characteristics, a ceramic bar or a Cu plate may be attached to bottom surfaces of the light source 241 and the photodetector 242. For optical axis alignment, a key pattern may be formed on the PCB 210. An electrode pattern, an adhesive pad for adhering the first reflecting mirror 251, and the second reflecting mirror 252 may be formed on the top surfaces of the light source 241 and the photodetector 242.

Figure 3D:
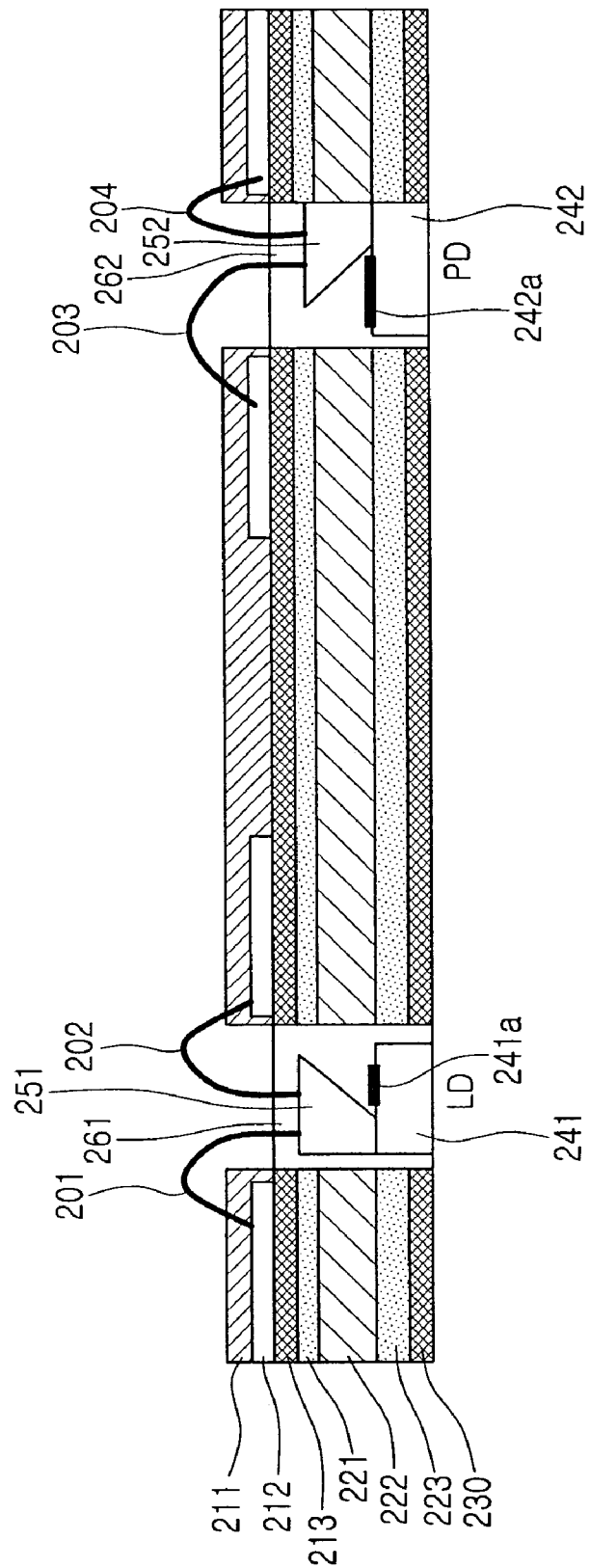

Referring to FIG. 3D, the first reflecting mirror 251 is positioned on the light source 241 of FIG. 3C, and the second reflecting mirror 252 is positioned on the photodetector 242 of FIG. 3C. In the first reflecting mirror 251, the light emitting surface 241a and a surface facing the cleavage surface of the waveguide 220 are inclined with each other at a predetermined angle in order to cause the optical signal emitted from the light emitting surface 241a to be incident to a side of the core 222. In the second reflecting mirror 252, the light receiving surface 242a and a surface facing a side of the core 222 are inclined with each other at a predetermined angle in order to reflect the optical signal emitted from the side of the core 222 to the light receiving surface 242a of the photodetector 242.

Electrical terminals electrically connected with electrodes of the light source 241 and the photodetector 242 may be formed in the first reflecting mirror 251 and the second reflecting mirror 252. Each of the electrical terminals may be electrically connected to the driving circuit patterns 212 of the PCB 210 by wires 201, 202, 203, and 204. The first reflecting mirror 251 and the second reflecting mirror 252 may be fixed on the adhesive pads using solder or epoxy. The inclined angles of the first reflecting mirror 251 and the second reflecting mirror 252 range 35°-55° can be adjusted according to materials and peripheral devices.

Refractive index matching materials 261 and 262 fill the grooves 271 and 272 to match a refractive index difference between the light source 241 and the core 222 and a refractive index difference between the photodetector 242 and the core 222.

Figure 4:
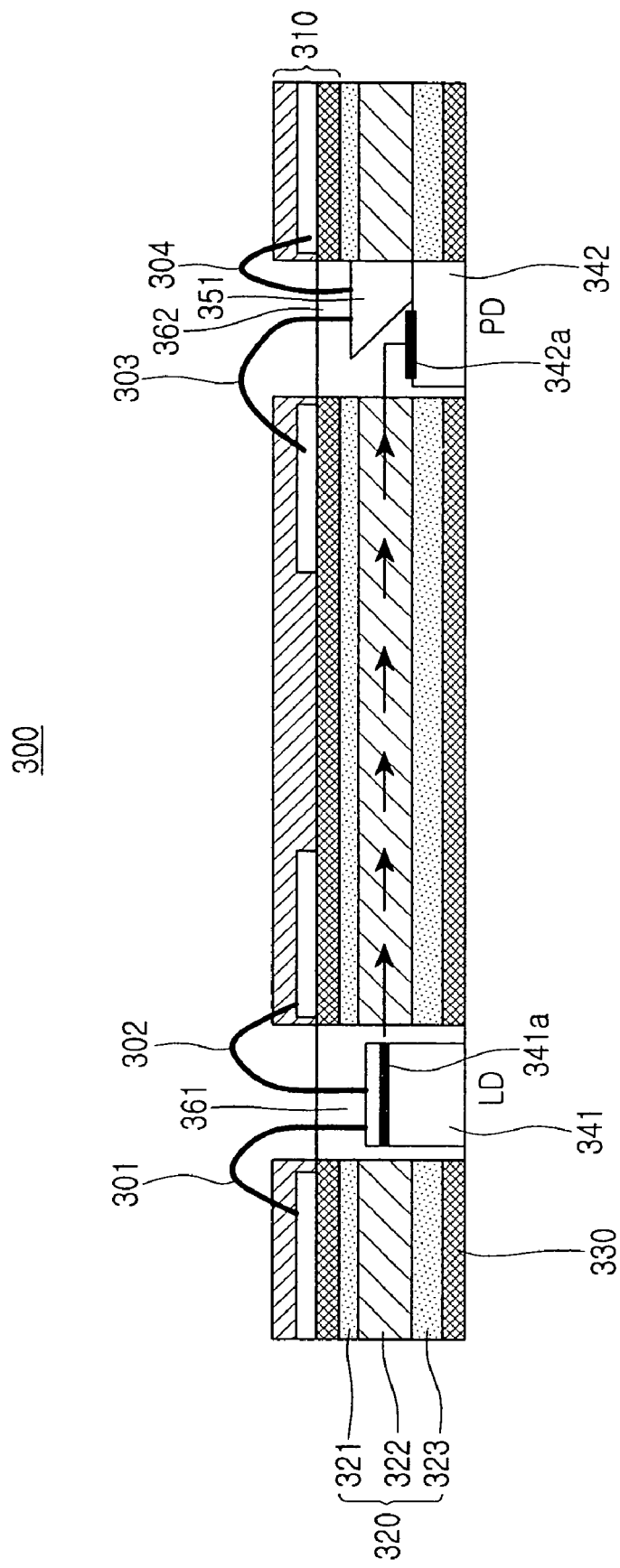
FIG. 4 illustrates an optical module according to a second embodiment of the present invention.

FIG. 4 illustrates an optical module 300 according to a second embodiment of the present invention. As shown, the optical module 300 includes a lower board 330, a light source 341 for generating an optical signal, a waveguide 320 on the lower board 330 for waveguiding the optical signal, a photodetector 342 for detecting the optical signal, a reflecting mirror 351 on the photodetector 342 for reflecting an optical signal emitted from the waveguide 320 in a vertical downward direction, and a PCB 310 on the waveguide 320, and a plurality of grooves extending from the PCB 310 to the lower board 330.

The waveguide 320 includes a lower clad 323, a core 322, and an upper clad 321, and emits an optical signal incident through the cleavage surface of its side through the cleavage surface of its other side. The PCB 310 includes driving circuit patterns for driving the light source 341 and the photodetector 342, and a protecting layer may be formed on the PCB 310. The driving circuit patterns are electrically connected with the light source 341 or the reflecting mirror 351 by wires 301, 302, 303, and 304.

In the current embodiment of the present invention, an active layer 341a of the light source 341 is positioned in parallel with the core 322, and the light source 341 directly causes generated light to be incident through the cleavage surface of a side of the core 322. The light source 341 and the photodetector 342 are placed on corresponding grooves, and the corresponding grooves are filled with refractive index matching materials 361 and 362. A light receiving surface 342a of the photodetector 342 faces the reflecting mirror 351.

Figure 5:
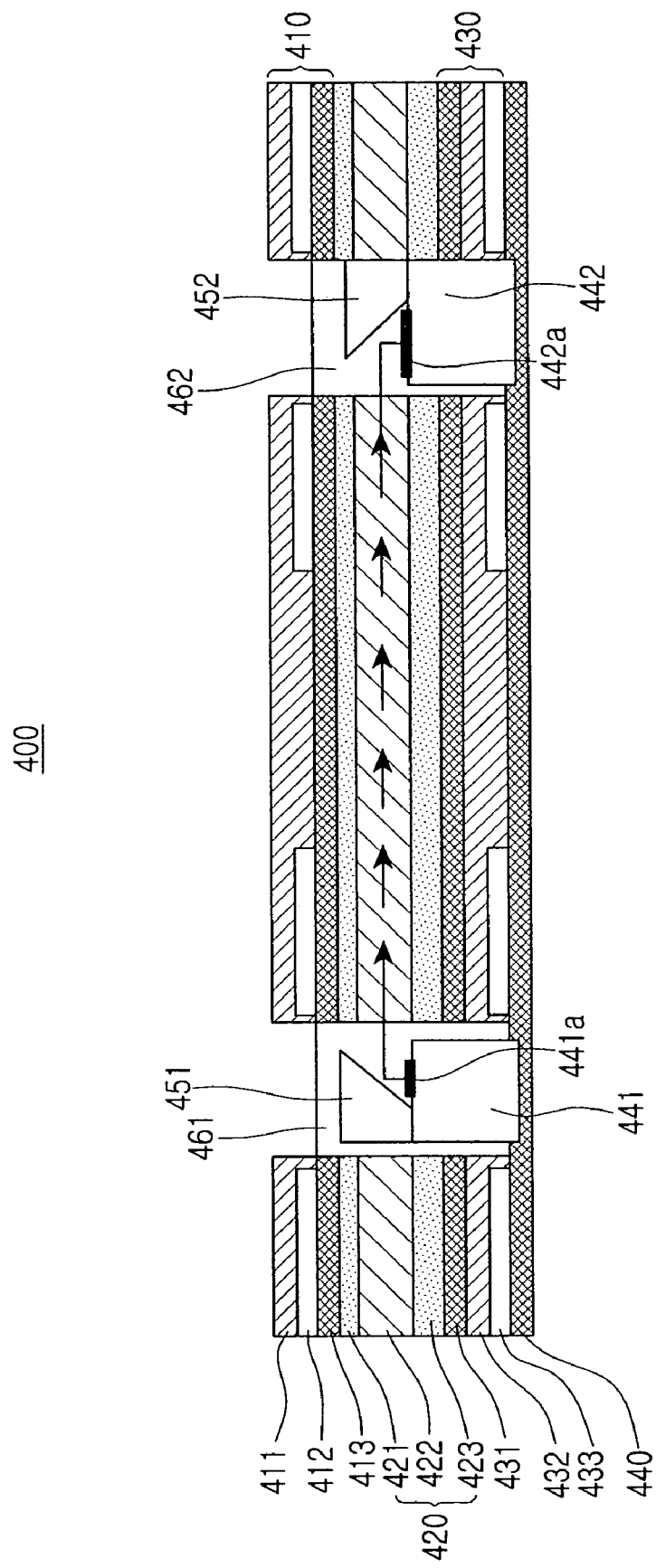
FIG. 5 illustrates an optical module according to a third embodiment of the present invention.

FIG. 5 illustrates an optical module 400 according to a third embodiment of the present invention. As shown, the optical module 400 includes a first PCB 410, a second PCB 430, a light source 441 for generating an optical signal, a waveguide 420 between the first PCB 410 and the second PCB 430 for waveguiding the optical signal, a photodetector 442 for detecting the optical signal, a first reflecting mirror 451 on the light source 441 for reflecting the optical signal generated by the light source 441 to a side of the waveguide 420, and a second reflecting mirror 452 on the photodetector 442 for reflecting the optical signal emitted from the waveguide 420 in a vertical downward direction. The light source 441 and the photodetector 442 are positioned such that their light emitting surface 441a and light receiving surface 442a face the opened upper portions of the corresponding grooves. Refractive index matching materials 461 and 462 are applied around the light source 441 and the photodetector 442.

The waveguide 420 includes a lower clad 423, a core 422, and an upper clad 421 and emits an optical signal incident to the cleavage surface of a side of the core 422 to the cleavage surface of the other side of the core 422.

The first PCB 410 and the second PCB 430 include driving circuit patterns 412 and 433 on boards 413 and 440 and protecting layers 411 and 432 on the boards 413 and 440 for covering the driving circuit patterns 412 and 433, respectively. The driving circuit patterns 412 and 433 of the second PCB 430 are electrically connected with the light source 441 and the photodetector 442 and may be connected to external elements at the other side of the first PCB 410. Polymer layers may be interposed between the first PCB 410 and the waveguide 420 and between the waveguide 420 and the second PCB 430.

In the current embodiment of the present invention, a plurality of PCBs is deposited, thereby applying currents to the light source 441 and the photodetector 442 without using wires. The refractive index matching materials 461 and 462 can minimize an optical loss such as scattering of an optical signal or surface reflection. For the refractive index matching materials 461 and 462, epoxy may be used. The first PCB 410 and the second PCB 430 may be flexible PCBs.

Figure 6:
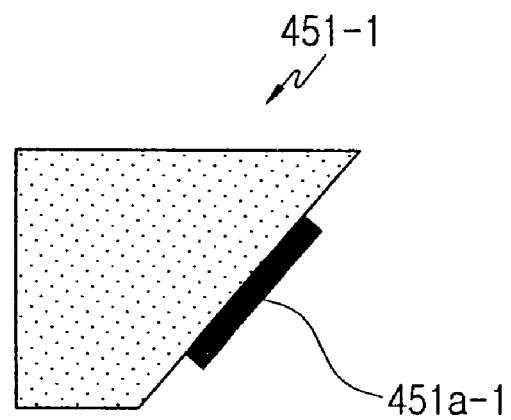
FIGS. 6 and 7 illustrate a side of a reflecting mirror according to the present invention.
Figure 7:
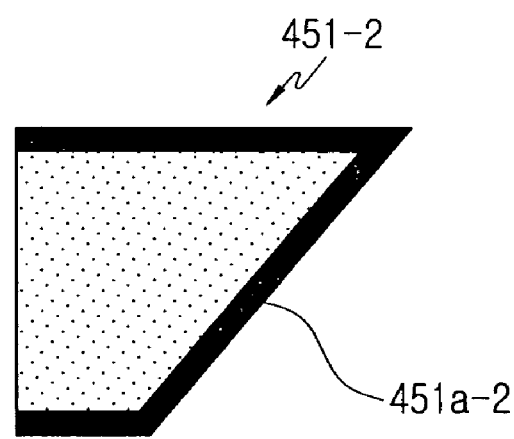
Figure 8A:
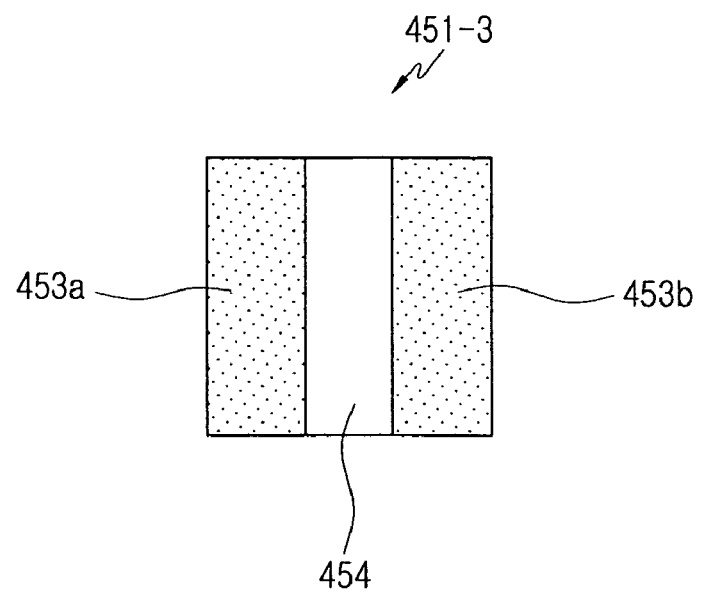
FIGS. 8A and 8B illustrate an example of a reflecting mirror according to the present invention.
Figure 8B:
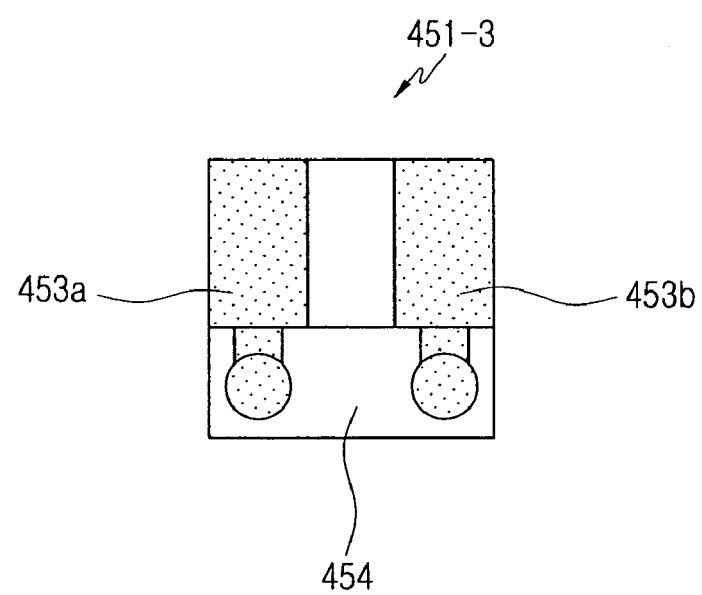

FIGS. 6 and 7 illustrate a side of a reflecting mirror according to the present invention, and FIGS. 8A and 8B illustrate an example of a reflecting mirror according to the present invention. In FIG. 6, a reflecting mirror 451-1 includes only a reflecting surface 451a-1 for reflecting an optical signal.

In FIG. 7 and FIGS. 8A and 8B, the first reflecting mirror and the second reflecting mirror or the reflecting mirror according to the first through third embodiments of the present invention include electrical terminals for electrically connecting the light source and the photodetector.

More particularly, FIG. 7 is a side view of a reflecting mirror 451-2 including a reflecting layer surrounding a top surface, an inclined surface, and a bottom surface, and an electrode 451a-2.

FIGS. 8A and 8B illustrate an example of a reflecting mirror according to the first through third embodiments of the present invention. FIG. 8A shows the top surface of the reflecting mirror shown in FIGS. 4 and 5. In FIG. 8A, a reflecting mirror 451-3 includes electrodes 453a and 453b and a region 454 that is electrically separated between the electrodes 453a and 453b. FIG. 8B shows the bottom surface of the reflecting mirror 451-3 which contacts the light source or the photodetector. It can be seen from FIG. 8B that the reflecting mirror 451-3 includes terminals extending from the electrodes 453a and 453b.

Figure 9A:
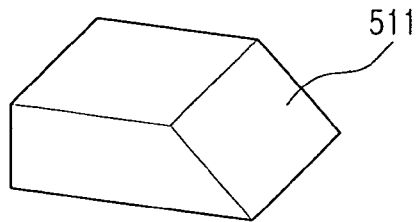
FIGS. 9A through 9C illustrate reflecting mirrors that are applicable to an optical module according to the present invention.
Figure 9B:
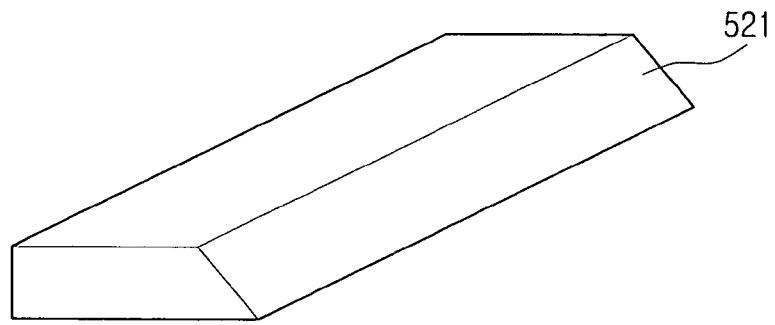
Figure 9C:
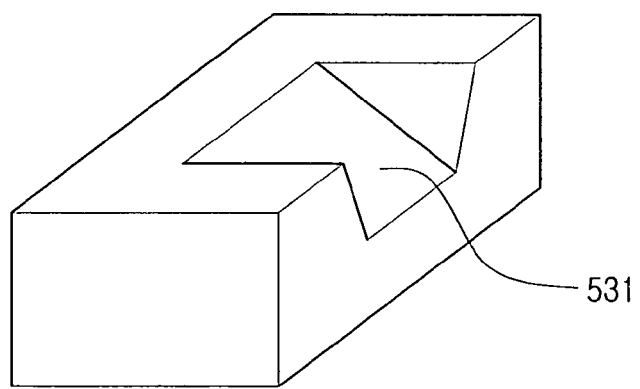

FIGS. 9A through 9C illustrate reflecting mirrors that are applicable to an optical module according to the present invention. A reflecting mirror 510 of FIG. 9A takes the form of a small chip and includes a reflecting surface 511 for reflecting an optical signal. A reflecting mirror 520 of FIG. 9B takes the form of a bar and includes a reflecting surface 521 along a longitudinal axis. The reflecting mirror 520 can be used when the light source and the photodetector according to the second and third embodiments of the present invention take the form of a bar. In a reflecting mirror 530 of FIG. 9C, a reflecting surface 531 is etched to be inclined. The reflecting surface 531 may be inclined between 35° and 55° or have an etched concave shape.

According to the present invention, an optical module can receive and emit light and include a waveguide having a small volume and a small optical loss and a PCB while simplifying a manufacturing process.

While the present invention has been shown and described with reference to preferred embodiments thereof, it will be understood by those skilled in the art that various changes in form and details may be made therein without departing from the spirit and scope of the invention.

What is claimed is:

1. An optical module comprising:
   a light source for generating an optical signal;
   a waveguide for waveguiding the optical signal;
   a photodetector for detecting the optical signal;
   a first reflecting mirror on the light source for reflecting the optical signal generated by the light source to a side of the waveguide;
   a second reflecting mirror on the photodetector for reflecting the optical signal emitted from the waveguide in a vertical downward direction;
   a Printed Circuit Board (PCB) on the waveguide;
   a lower board under the waveguide;
   a plurality of grooves extending from the PCB to the top surface of the lower board;
   wherein the photodetector detects the optical signal reflected by the second reflecting mirror; and
   wherein the light source and the photodetector are placed in the grooves, respectively.

2. The optical module of claim 1, wherein the first reflecting mirror and the second reflecting mirror are formed such that their reflecting surfaces for reflecting the optical signal are inclined with respect to a traveling direction of the incident or reflected optical signal at an angle between 35° and 55° or have an excavated concave shape.

3. The optical module of claim 1, wherein the first reflecting mirror includes a reflecting surface for reflecting the optical signal output from the light source.

4. The optical module of claim 3, wherein the reflecting surface is inclined with respect to the incident optical signal at an angle of 45°.

5. The optical module of claim 1, wherein the second reflecting mirror includes a reflecting surface for reflecting the optical signal emitted from the waveguide to the photodetector.

6. The optical module of claim 5, wherein the reflecting surface is inclined with respect to the incident optical signal from the waveguide at an angle of 45°.

7. The optical module of claim 1, wherein the PCB includes driving circuit patterns for driving the light source and the photodetector.

8. The optical module of claim 1, further comprising refractive index matching materials for surrounding the first reflecting mirror and the second reflecting mirror in the grooves, the light source, and the photodetector.

9. The optical module of claim 8, wherein the refractive index matching materials match a refractive index difference between the light source and a core of the waveguide.

10. The optical module of claim 8, wherein the refractive index matching materials match a refractive index difference between the photodetector and a core of the waveguide.

11. The optical module of claim 1, wherein a ceramic bar or a Cu plate is coupled to bottom surfaces of the light source and the photodetector.

* * * * *